United States Patent [19]

Horna

[11] Patent Number: 4,600,815
[45] Date of Patent: Jul. 15, 1986

[54] AUTOMATIC GAIN CONTROL FOR ECHO CANCELLERS AND SIMILAR ADAPTIVE SYSTEMS

[75] Inventor: Otakar A. Horna, Bethesda, Md.

[73] Assignee: Communications Satellite Corporation, Washington, D.C.

[21] Appl. No.: 403,449

[22] Filed: Jul. 30, 1982

[51] Int. Cl.[4] .............................................. H04B 3/20
[52] U.S. Cl. ................................................ 179/170.2
[58] Field of Search ................ 179/170.2, 81 A, 81 B, 179/18 BC; 381/71, 93, 94, 95

[56] References Cited

U.S. PATENT DOCUMENTS 4,225,754 9/1980 Bernard et al. .................. 179/81 B
4,362,909 12/1982 Snijders et al. .................. 179/170.2

FOREIGN PATENT DOCUMENTS 0008910 1/1979 Japan ............................... 179/170.2

Primary Examiner—Gene Z. Rubinson
Assistant Examiner—R. Vaas
Attorney, Agent, or Firm—Sughrue, Mion, Zinn, Macpeak & Seas

[57] ABSTRACT

An echo canceller for a teleconferencing device is herein disclosed in which a first attenuator limits the dynamic range of a composite speech-echo input signal. A second attenuator, having a gain equal to that of the first attenuator, alters the gain of the emulated echo signal produced by an AFIR filter. The gains of both the first attenuator and the second attenuator are controlled by a common automatic gain control device, which alters the gains as a function of both the dynamic range of the input composite signal and a feedback signal from the output of the first attenuator. This matched attenuator construction allows the AFIR filter to operate within its dynamic range while also limiting the range of the input speech/echo signal. The echo canceller may further comprise a third attenuator which is disposed in the adaptive feedback loop of the AFIR filter. The third attenuator has a gain inversely proportional to the gains of both the first attenuator and the second attenuator. This third attenuator eliminates the gain components from the adaptive error signal. A fourth attenuator may also be provided which limits the received echo source signal, such that the echo canceller is not overloaded.

10 Claims, 3 Drawing Figures

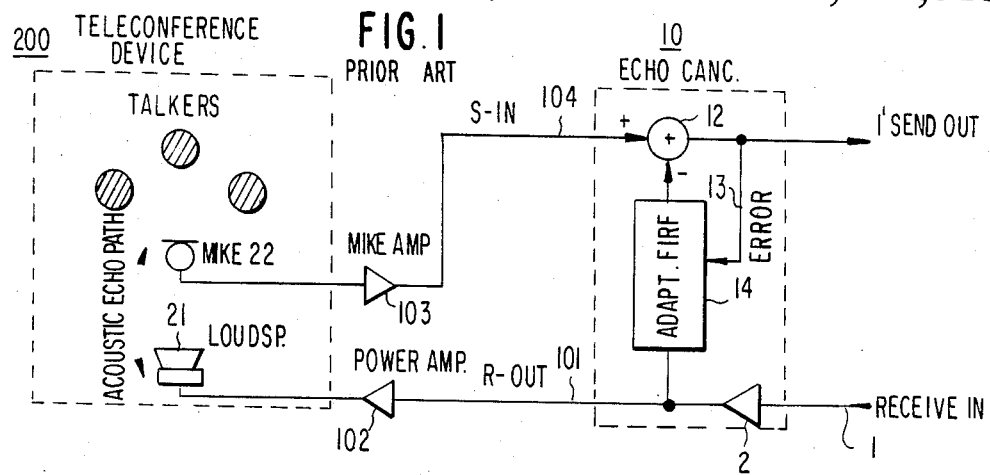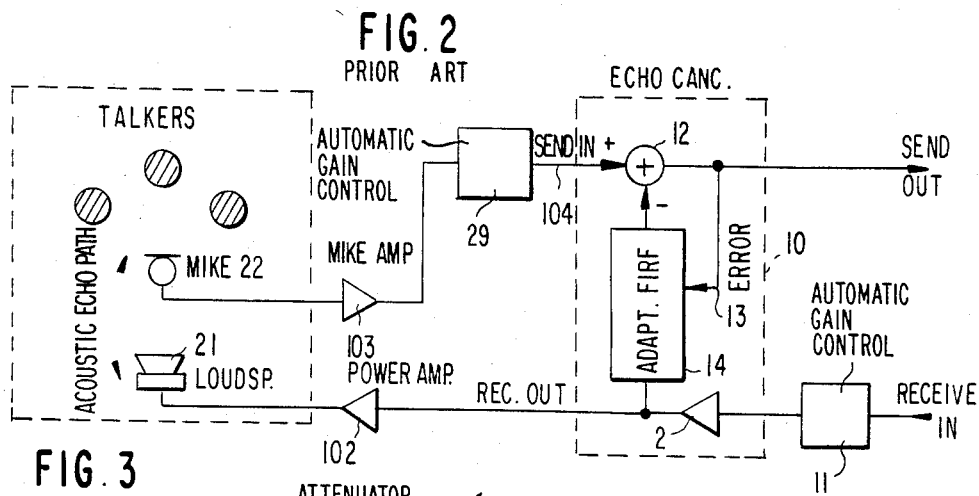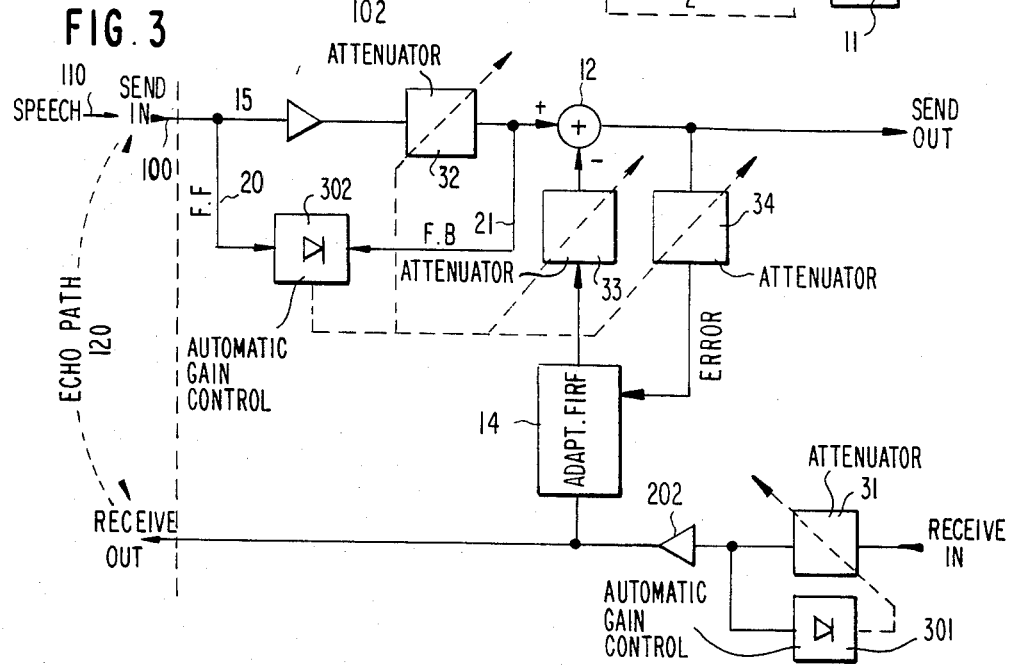

AUTOMATIC GAIN CONTROL FOR ECHO CANCELLERS AND SIMILAR ADAPTIVE SYSTEMS

BACKGROUND OF THE INVENTION

The present invention relates generally to the field of teleconferencing devices, and is particularly adapted to providing an echo cancellation system for a teleconferencing device in which an instantaneous acoustic coupling is cancelled by use of a plurality of matched attenuators.

Adaptive finite impulse response (AFIR) filters are widely used for echo cancellation in long distance telephone circuits. See, e.g., O. A. Horna, "Echo Canceller Utilizing Pseudologarithmic Coding", NTC - 77, Conference Record, Vol. 1, pages 04:7-1 through 7-8. An AFIR filter produces an output signal which is a finite-in-time replication of a series of impulse signals at its input. In addition, the AFIR filter comprises means by which this output signal can be shifted in amplitude as a function of an error signal which is fed back to the filter. This error signal is the output of a comparator which compares the output of the AFIR filter with the echo signal component of a received signal. As referred to hereinafter, an "echo signal" is that portion of a received first signal which is reproduced in a transmitted second signal.

Experiments have shown that an AFIR echo canceller can also be used to cancel acoustic echo between the microphone and the loudspeaker of a teleconferencing device, as shown in FIG. 1. In FIG. 1, the received signal 1 is fed through amplifier 2 to both the input of the AFIR filter 14 and the input to the channel 101. The received signal is amplified through power amplifier 102 and is fed to the loudspeaker 21 of a teleconference device 200. The teleconference device operates in a well-known manner and employs a single microphone 22 mounted within its housing. Each conference participant must talk in turn through this single microphone.

The acoustic echo path for the teleconference device is the path over which the signal of the loudspeaker is received by the microphone. This acoustic echo path creates a disturbing echo signal which must be eliminated from the transmitted signal in order to maintain clear communications. The transmit signal from the teleconference device (hereinafter referred to as the "speech/echo signal") is fed by the microphone 22 through the microphone amplifier 103 to the positive input of the subtraction circuit 12 of the echo canceller 10. As previously described, the AFIR filter 14 emulates the echo path response and synthesizes an echo signal which is subtracted in the comparator from the speech/echo signal. The signal at the output of the echo canceller will be referred to as the "send-out" signal. The resulting send-out signal 1' is thus free of the signal from the loudspeaker 21, i.e. free of the acoustic echo. The adaptive operation of the AFIR filter is completed by use of the feedback signal 13; that is, the filter is adapted to overcome any residual echo remaining in the resulting send-out signal.

As previously stated, the above described echo cancellers are currently in use in long distance telephone circuits and other similar applications. However, the basic structure of the echo canceller must be modified in order to perform satisfactorily in a teleconference device application. Specifically, the basic echo canceller configuration as shown in FIG. 1 must be modified to compensate for the large dynamic range in the speech/echo signal. In telephone systems, the distance between the talker and the microphone is held nearly constant, and the acoustic echo path between the loudspeaker and the microphone is minimized by the "muffling effect" of the talker's head. These factors serve to limit the speech/echo signal level to a relatively narrow range of response. In teleconference devices, on the other hand, the distances between the acoustic inputs (e.g. the conference members sitting around a large table) and the microphone vary greatly, which produces a speech/echo signal which varies greatly in signal strength. Thus, means must be incorporated into the echo canceller for a teleconference device by which the dynamic range of the speech/echo signal is limited to the range of operation of the AFIR filter.

One of the methods used in the prior art to limit a signal to a relatively narrow range of response is to incorporate an automatic gain control (AGC) circuit into the signal path of the device in question. Referring to FIG. 2, if such a gain control circuit is placed in the receive-in path of the echo canceller (AGC 11 of FIG. 2), it will act as a level compressor and will protect the receive side of an echo canceller from overload. However, AGC 11 may also increase the gain for a weak signal; that is, it can boost the system's residual echo signal. Therefore, AGC 11 must be designed to have only a very limited operating range—it must protect from overload while being inactive for normal signal levels.

Another modification of the basic configuration of FIG. 1 which limits the dynamic range of the input signal to the echo canceller is to insert an AGC device in the speech/echo signal path at the input to the comparator of the echo canceller (AGC 29 of FIG. 2). However, this configuration will result in faulty operation of the AFIR filter of the echo canceller due to the non-linear operation of the AGC circuit. More particularly, with the AFIR filter fully adapted and operating at a steady state with no near-end speech, the true echo at the positive input of the comparator and emulated echo at the negative input are equal. When a person then talks into the microphone 22 of the teleconferencing device, AGC 29 will change the gain of the speech/echo signal. In changing the gain of the speech/echo signal, the echo path signal component will be adjusted along with the speech signal component. When the speech/echo signal is inputted to the comparator, the AFIR filter will output its predicted echo signal. These two signals, the echo replication signal from the AFIR filter and the echo path component of the gain-adjusted speech/echo signal, will now be unequal due to the fact that the emulated echo signal has not been gain-adjusted. Further, this inequality will be beyond the normal echo path adaptive parameters of the AFIR filter. The filter will sense this "double-talk" (or overload) situation, and will disable its adaptive operation in order to protect the stored response from contamination. The AFIR filter is thus unable to adapt to the new condition in the echo path, and instead of cancelling the echo, it can even generate an echo signal.

SUMMARY OF THE INVENTION

It is thus an object of the present invention to provide an echo canceller for a two-way teleconferencing communications system.

It is another object of the present invention to modify the echo canceller structure utilized in long distance telephone communications for use in a teleconference communications application.

It is a further object of the present invention to provide an echo canceller for a teleconferencing device which is relatively simple in operation and structure while being highly reliable.

The foregoing and other objects of the present invention are realized by the provision of a plurality of matched attenuators to the various inputs and outputs of an AFIR echo canceller. Specifically, matched attenuators are provided at both inputs to the comparator, as well as in the feedback loop of the AFIR filter. The speech/echo signal is inputted to a first automatic gain control device which controls the response of the matched attenuators connected to the inputs to the comparator (as well as the attenuator in the feedback path of the AFIR filter). Alternatively (or in combination), feedback is taken from the output of one of the attenuators to the automatic gain control device to further control the response of the attenuators. In this manner, the change in the echo path component of the speech/echo signal, which is produced by the attenuation of a first attenuator, is matched in the emulated echo signal by the attenuation produced by a second attenuator interposed in the path between the AFIR filter and the comparator. Thus, the echo signal from the AFIR filter and the echo path component of the gain-adjusted response signal will be equal, such that the adaptive parameters of the AFIR filter will not be surpassed. The attenuator in the feedback path of the AFIR filter preferably has a gain characteristic inversely proportional to that of the other two attenuators, such that the gain component produced by the attenuators will be eliminated from the feedback error signal. A fourth attenuator (which is controlled by a second automatic gain control device) may be provided to the AFIR filter input in order to prevent system overload.

BRIEF DESCRIPTION OF THE DRAWINGS

The structure and function of the present invention will become more apparent upon a detailed description of the preferred embodiments thereof. In the description to follow, reference will be made to the accompanying drawings, in which:

FIG. 1 is a schematic diagram of a basic teleconference-echo canceller communication system;

FIG. 2 is a schematic diagram of a modified teleconference-echo canceller communication system; and FIG. 3 is a schematic diagram of the teleconference device echo canceller of the present invention.

DETAILED DESCRIPTION OF THE PREFERRED EMBODIMENT

A preferred embodiment of the present invention will now be discussed with reference to FIG. 3. In the discussion to follow, it is to be understood that the attenuators are assumed to be purely resistive devices; that is, the attenuators alter the amplitude of the unit impulse response of the echo path without also altering its other characteristics such as its shape or delay.

In FIG. 3, the signal received from the far end talker (hereinafter referred to as the "echo source signal") attenuated by the attenuator 31, which is controlled by the automatic gain control device 301 to only attenuate signals of abnormally high amplitudes which would tend to overload the echo canceller system. The attenuated echo source signal passes through amplifier 202 to the receive output 20 and then traverses the echo path to the send input 100. The attenuated echo source signal is also inputted to the AFIR 14. As previously discussed, the AFIR filter 14 produces an output signal of finite time duration which is a prediction of the echo signal component which will be received at the terminal 100.

The input signal to the send input 100 of the echo canceller comprises a composite speech/echo signal having both a dynamic speech component 110 and an echo path component 120. This composite signal is fed through amplifier 15 to attenuator 32, which limits the dynamic range of the composite signal to the parameters of the AFIR filter. The output of AT2 comprises the positive input to a subtractor 12. The negative input of the subtractor 12 is provided by attenuator 33, which receives its input from the output of the AFIR filter 14. Both attenuator 32 and attenuator 33 are controlled by automatic gain control device 302. The control signal from device 302 is derived from either a feed forward signal 20 comprising the original composite signal, or from a feedback signal 21 comprising the attenuated composite signal, or both.

It is important to note that the gain $A_2$ of attenuator 32 is initially set to be equal to the gain $A_3$ of attenuator 33. Further, since attenuators 32 and 33 derive their control signals from a common source 302, the change of the gain of the composite signal which is produced by 32 is compensated by the same change of gain in the output of the adaptive filter produced by 33. Under this condition, the AFIR filter does not need to change the value of its coefficients in order to cancel the echo portion of the composite signal.

The signal E' which is the output of the subtractor 12 can be expressed as follows:

$$E' = A_2 Y - A_3 \hat{Y} = A_2(Y - \hat{Y}) = A_2 E$$

where Y is the echo signal, $\hat{Y}$ is the AFIR filter output, and $E = Y - \hat{Y}$ is the error signal for $A_2 = A_3 = 1$ (that is, the error without gain control AGC2). Note that for $A_2 = A_3 \neq 1$, the sensitivity of the error detector must be adjusted in order to keep the correction loop working under optimum conditions; in other words, gain $A_2 = A_3$ must be eliminated from the error signal. This can be achieved, if necessary, by adding another gain control 34 at the error input of the AFIR filter. The matched gain $A_4$ of 34 must be inversely proportional to the gain $A_2$ and $A_3$. The resulting error signal E'' can be expressed as:

$$E' = (A_2 E) A_4 = (A_2 E) 1/A_2 = E.$$

Attenuators 31 through 34 can be either digital or analog devices. Digital attenuators have been recently developed (Analog Devices CMOS LOGDAC AD7111) which have steps of 0.35 db and dynamic ranges of 0 to 80 db. These devices are particularly well suited to be used as the attenuators of the present invention.

In summary, an echo canceller for a teleconferencing device has been disclosed in which the dynamic range of signal response is attenuated while maintaining effective AFIR filter operation. Such an echo canceller has wide application within the general field of communication devices, due to its relatively simple structure and operation.

It is to be understood that modifications to the present invention as described above can be made without departing from the spirit and scope of the invention as defined in the appended claims.

I claim:

1. In an echo canceller for cancelling an echo signal component from a composite signal, said echo canceller being of the type including prediction means for generating an output representing a predicted value of said echo signal component and subtraction means for subtracting a first signal representing said predicted value from a second signal representing said composite signal, an automatic gain control circuit comprising:
   first frequency-independent attenuator means for attenuating the output of said prediction means with a first frequency-independent attenuation factor to obtain said first signal; and
   second frequency-independent attenuator means for attenuating said composite signal with a second frequency-independent attenuation factor substantially equal to said first attenuation factor to obtain said second signal.

2. In a teleconference system of the type wherein a received signal is passed through an echo canceller to a loudspeaker and a microphone passes a composite signal including an echo signal component to said echo canceller, said echo canceller generating from said received signal a predicted value of said echo signal component and subtracting said predicted value from said composite signal to cancel said echo, an automatic gain control circuit comprising:
   first frequency-independent attenuating means for attenuating said predicted value; and
   second frequency-independent attenuating means for attenuating said composite signal, said first and second attenuating means having substantially equal attenuation factors.

3. The automatic gain control circuit as recited in any of claims 1 or 2, wherein said attenuation factor of said first attenuating means is determined by a control signal, said echo canceller further comprising a control circuit for providing said control signal in accordance with the amplitude of said composite signal.

4. The automatic gain control circuit as recited in claim 3, wherein said attenuation factor of said second attenuating means is determined in accordance with said control signal.

5. The automatic gain control circuit as recited in any one of claims 1 or 2, wherein said attenuating factor of said second attenuating means is determined by a control signal, said automatic gain control circuit further comprising a control circuit for providing said control signal in accordance with the amplitude of said composite signal.

6. The automatic gain control circuit as recited in claim 1, wherein said predicted value is generated from an echo source signal derived from a received signal, said automatic gain control circuit further comprising third attenuator means for attenuating said received signal in accordance with a control signal to obtain said echo source signal, and a means for generating said control signal in accordance with the amplitude of said received signal.

7. The automatic gain control circuit as recited in claim 2, wherein said echo canceller generates said predicted value from said received signal by first deriving an echo source signal from said received signal and then generating said predicted value from said echo source signal, said automatic gain control circuit further comprising third attenuator means for attenuating said received signal in accordance with a control signal to obtain said echo source signal, and a means for generating said control signal in accordance with the amplitude of said received signal.

8. An echo canceller for cancelling an echo signal component from a composite signal to obtain a substantially echoless signal, said echo canceller comprising:
   adaptive prediction means for generating a predicted value signal of said echo signal component of said composite signal, said adaptive prediction means deriving said predicted value from an echo source signal in accordance with a prediction algorithm, said algorithm being adaptive in response to an adaptive feedback signal and said echo source signal being derived from a received signal;
   first attenuator means for attenuating said predicted value signal with a first frequency-independent attenuation factor in accordance with a first control signal to generate a first attenuator means output;
   second attenuator means for attenuating said composite signal with a second frequency-independent attenuation factor in accordance with said first control signal to generate a second attenuator means output;
   third attenuator means for attenuating said substantially echoless signal with a third frequency-independent attenuation factor in accordance with said first control signal to produce said adaptive feedback signal, said first attenuation factor being substantially equal to said second attenuation factor and said third attenuation factor being substantially inversely proportional to both of said first and second attenuation factors;
   first control means for generating said first control signal in accordance with the amplitude of said composite signal;
   subtraction means for subtracting the outputs of said first attenuator means and said second attenuator means, said subtractor means outputting said substantially echoless signal;
   fourth attenuator means for attenuating said received signal with a fourth frequency-independent attenuation factor in accordance with a second control signal to produce said echo source signal; and
   second control means for generating said second control signal as a function of the amplitude of said received signal.

9. The echo canceller as recited in claim 8, wherein said first control means generates said first control signal as a function of the amplitude of said output of said second attenuator means.

10. The echo canceller as recited in claim 8, wherein said first control means generates said first control signal as a function of both the amplitude of said composite signal and the amplitude of said output of said second attenuator means.

* * * * *